United States Patent [19]

Shinohara

[11] Patent Number: 5,657,071
[45] Date of Patent: Aug. 12, 1997

[54] METHOD AND APPARATUS FOR IMAGE PROCESSING UTILIZING PULSE WIDTH MODULATION OF A LASER BEAM

[75] Inventor: Koichiro Shinohara, Kanagawa, Japan

[73] Assignee: Fuji Xerox Co., Ltd., Tokyo, Japan

[21] Appl. No.: 407,712

[22] Filed: Mar. 21, 1995

[30] Foreign Application Priority Data

Mar. 22, 1994 [JP] Japan .................................. 6-050620

[51] Int. Cl.$^6$ .............................. B41J 2/47; G01D 15/14
[52] U.S. Cl. ........................................... 347/252; 347/131
[58] Field of Search ................................ 347/240, 252, 347/131; 358/298

[56] References Cited

U.S. PATENT DOCUMENTS 5,485,534   1/1996   Takemoto et al. .................. 382/263

FOREIGN PATENT DOCUMENTS

| 53-19201 | 2/1978 | Japan . |
| 1-280965 | 11/1989 | Japan . |
| 1-286675 | 11/1989 | Japan . |
| 5-276385 | 10/1993 | Japan . |

*Primary Examiner*—Benjamin H. Fuller
*Assistant Examiner*—L. Anderson
*Attorney, Agent, or Firm*—Finnegan, Henderson, Farabow, Garrett & Dunner, L.L.P.

[57] ABSTRACT

A method of processing image data to reproduce an image having good half-tone reproduction, sharpness, and details, through pulse modulation of a laser beam. In the method, the laser beam is turned on and off in accordance with the result of comparing an input image signal with a reference signal which has been frequency modulated in accordance with a shape feature of the input image signal. In the case of an image having low input contrast, the tone performance of an image output unit is improved by the mesh dots of the low spatial frequency. In the case of an image having high input contrast, an image having high sharpness and details is reproduced by the mesh dots of the high spatial frequency.

4 Claims, 5 Drawing Sheets

C: CENTER FREQUENCY
N: SAMPLING FREQUENCY
W: BAND WIDTH

METHOD AND APPARATUS FOR IMAGE PROCESSING UTILIZING PULSE WIDTH MODULATION OF A LASER BEAM

BACKGROUND OF THE INVENTION

1. Field of the Invention

The present invention relates to a method of processing image data for reproducing an image having good half-tone reproduction, sharpness, and details, through a pulse modulation of a laser beam, and an apparatus for executing the image processing method.

2. Discussion of the Related Art

In an image forming apparatus for reproducing a half-tone image through a pulse width modulation of a laser beam, such as a copying machine or a printer, as disclosed in Japanese Patent Unexamined Publication No. Sho. 53-19201, for example, a triangle wave signal is generated as a reference wave signal, and is compared with an analog image signal, and the laser beam is turned on and off in accordance with the result of the comparison.

In this method, to increase the sharpness of the reproduced image, it is necessary to increase the frequency of the reference wave signal. Further, to ameliorate a tone reproduction, it is necessary to decrease the frequency of the reference wave signal. To this end, a sharpness decision circuit is contained in an image processor section. A flag information signal outputted from the sharpness decision circuit is used for selecting one of a plurality of reference wave signals.

The triangle wave generating circuit is arranged so as to generate a triangle wave signal by integrating a reference clock signal. Therefore, it is difficult to keep the amplitude and the wave shape of these reference wave signals uniform.

To cope with this problem and, to improve the reliability, as described in Japanese Patent Unexamined Publication No. Hei. 5-276385, a sinusoidal wave signal is used in place of the triangle wave signal. However, an increase in the number of the reference wave signals leads to an increase in the number of required circuits, an increase in the cost to manufacture, and a defective image, such as interference.

SUMMARY OF THE INVENTION

The present invention has been made to solve the technical problems mentioned above, and has an object to provide an image processing method capable of reproducing an image which is sharp, has good tone and granularity and is capable of processing image data with a wide dynamic range.

Another object of the present invention is to provide an apparatus for executing the image processing method.

To achieve the above object, the present invention provides an image processing method for use with an image forming apparatus in which a photoreceptor is scanned with a laser beam modulated by an image signal, the method including the steps of: comparing an input image signal with a reference signal which has been frequency modulated in accordance with a shape feature of the input image signal; and turning on and off the laser beam in accordance with a result of the comparison.

Further, the present invention provides an image processing apparatus in which a photoreceptor is scanned with a laser beam modulated by an image signal, the apparatus including: image input means for inputting an image signal to the image processing apparatus; shape feature extracting means for extracting a shape feature of the image signal from the image input means; frequency modulating means for frequency modulating a signal representative of the shape feature outputted from the shape feature extracting means to form a reference signal; and comparing means for comparing the reference signal and the image signal to produce a signal for turning on and off the laser beam.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

FIG. 3($b$) is a graph showing a frequency band of the frequency modulating circuit;

DETAILED DESCRIPTION OF THE PREFERRED EMBODIMENT

Figure 1:
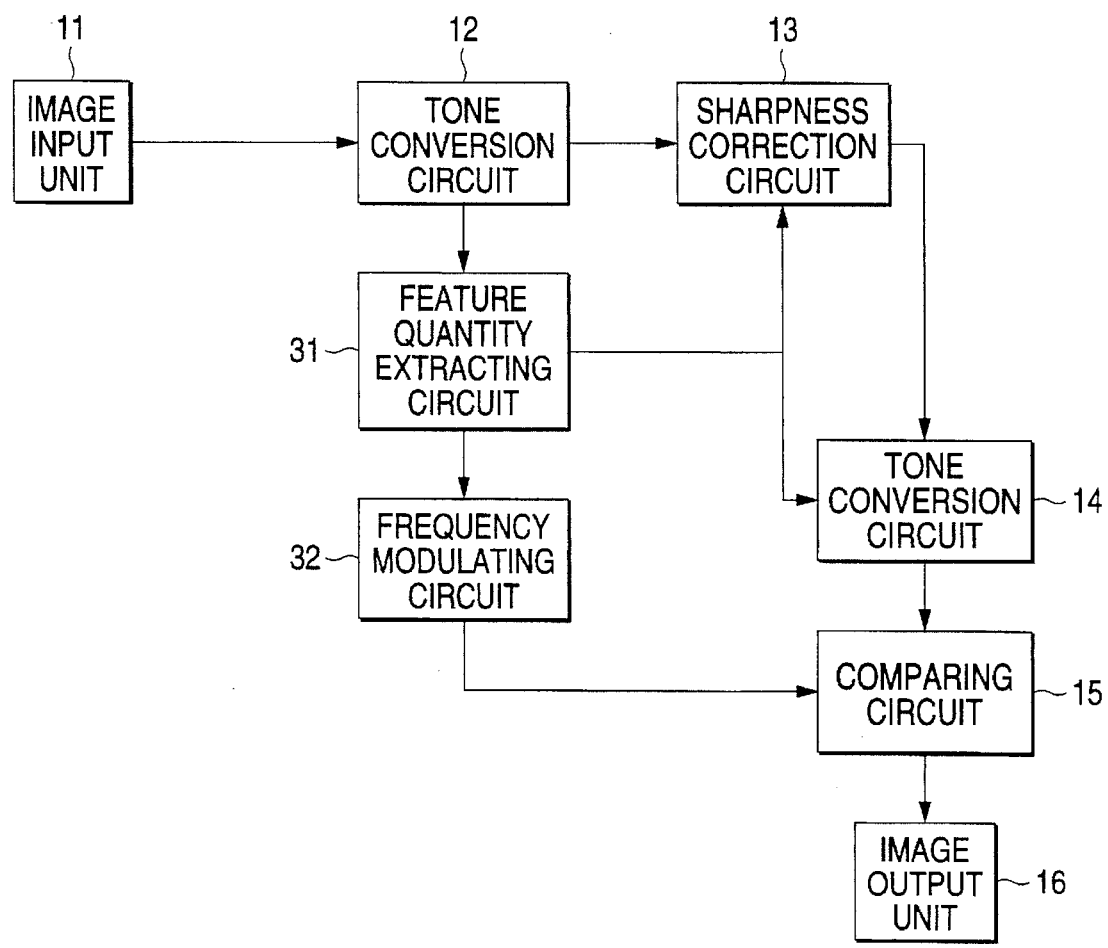
FIG. 1 is a block diagram showing an image processing apparatus according to an embodiment of the present invention.

An image processing apparatus according to an embodiment of the present invention is shown in block form in FIG. 1.

As shown, the image processing apparatus includes an image input unit 11 for inputting an image signal to the image processing apparatus, a tone conversion circuit 12 for correcting a tone of the input signal received from the image input unit 11, a feature quantity extracting circuit 31 for extracting the shape feature, e.g., a degree of edge, from the tone-converted image signal, a sharpness correction circuit 13 for correcting a sharpness of an image under process in accordance with the extracted shape feature a tone conversion circuit 14 for correcting a tone of an output image in accordance with the shape feature, a frequency modulating circuit 32 for frequency modulating the shape feature, and a comparing circuit 15 for comparing the tone-converted image signal and the frequency modulated shape feature, to thereby produce a two-level output signal for transmission to an image output unit 16.

Figure 2:
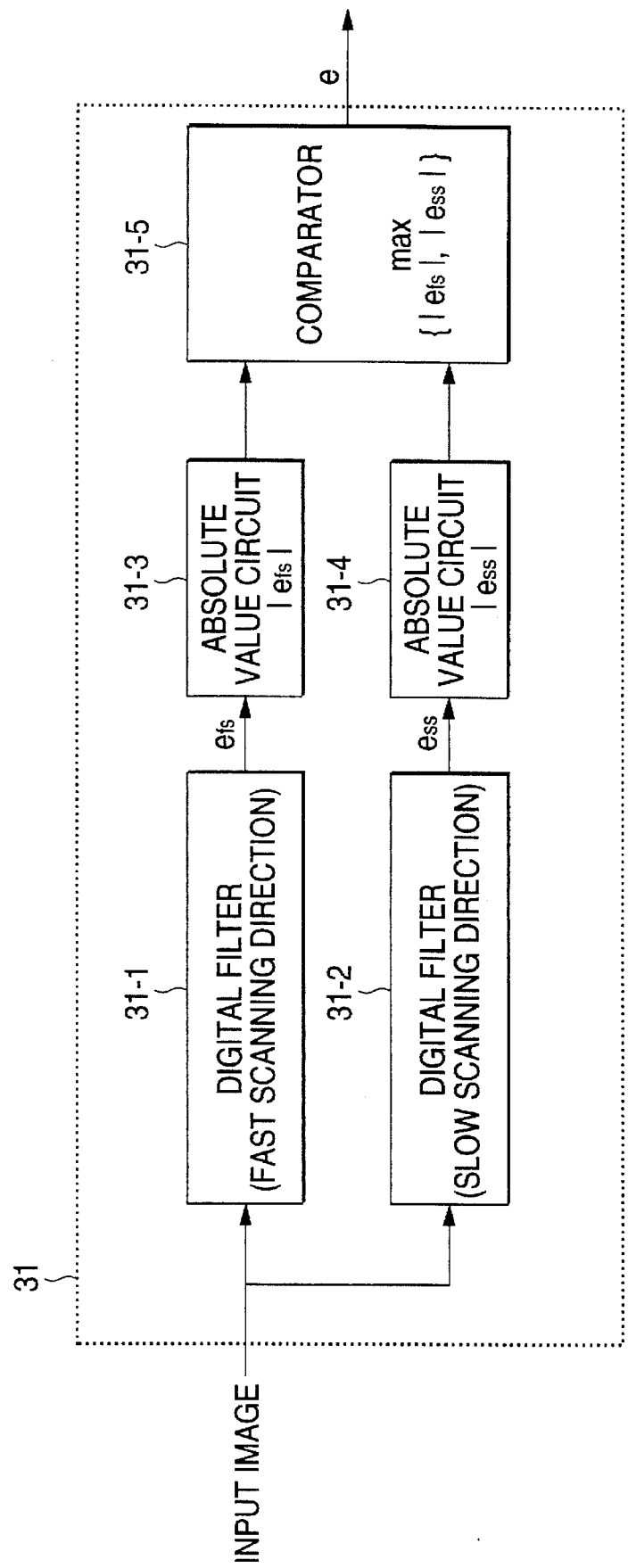
FIG. 2 is a block diagram showing the details of a feature quantity extracting circuit in the image processing apparatus of FIG. 1.

The details of the feature quantity extracting circuit 31 shown in FIG. 1 is shown in FIG. 2. The feature quantity extracting circuit 31 in this embodiment is a kind of an edge detecting filter. A detecting section of the filter consists of digital filters 31-1, and 31-2 sensitive in a fast scanning direction and a slow scanning direction. The filter coefficients of these digital filters are set as indicated in Tables 1 and 2 respectively.

TABLE 1

| | | | | |
|---|---|---|---|---|
| −0.25 | 0 | 0.5 | 0 | −0.25 |
| −0.25 | 0 | 0.5 | 0 | −0.25 |
| −0.25 | 0 | 0.5 | 0 | −0.25 |
| −0.25 | 0 | 0.5 | 0 | −0.25 |
| −0.25 | 0 | 0.5 | 0 | −0.25 |

TABLE 2

| -0.25 | -0.25 | -0.25 | -0.25 | -0.25 |
|-------|-------|-------|-------|-------|
| 0     | 0     | 0     | 0     | 0     |
| 0.50  | 0.50  | 0.50  | 0.50  | 0.50  |
| 0     | 0     | 0     | 0     | 0     |
| -0.25 | -0.25 | -0.25 | -0.25 | -0.25 |

Output signals $e_{fs}$ and $e_{ss}$ of the digital filters 31-1 and 31-2 pass through absolute value circuits 31-3 and 31-4, and enter a comparator 31-5, in which the larger one of the output signals, $|e_{fs}|$ and $|e_{ss}|$, is outputted as an edge quantity e.

Figure 3:
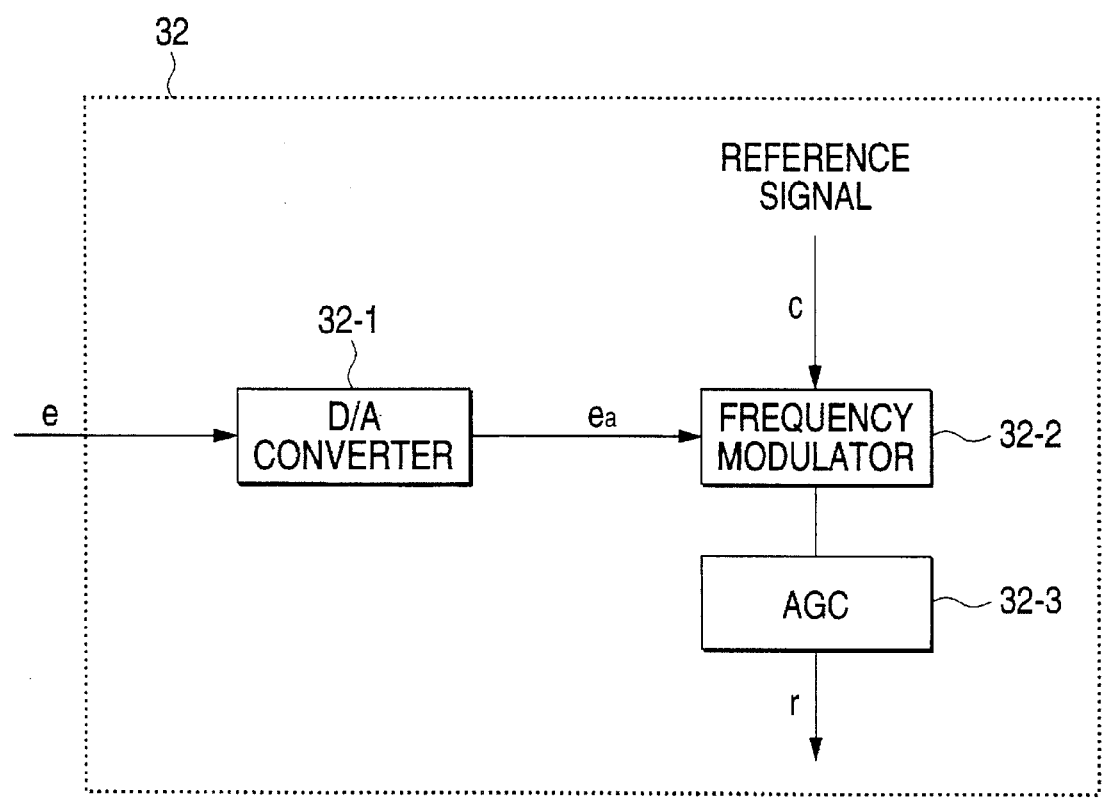
FIG. 3($a$) is a block diagram showing the details of a frequency modulating circuit in the image processing apparatus of FIG. 1.
Figure 3:
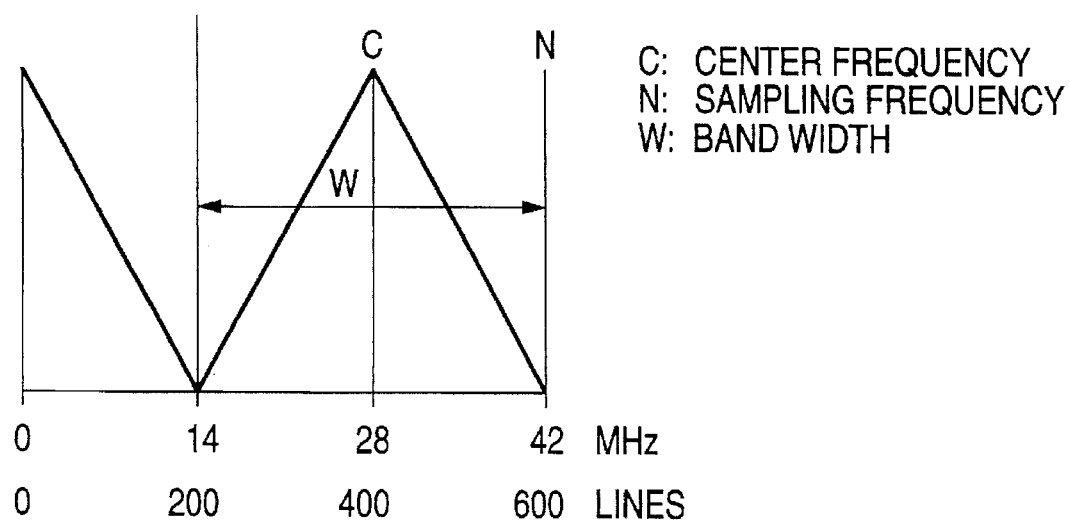

The details of the frequency modulating circuit 32 shown in FIG. 1 is shown in FIG. 3(a).

In the image processing apparatus of the instant embodiment, the resolution is 600 dpi (dots/inch) and a pixel clock signal handled in the range of the tone conversion circuit 12 to the comparing circuit 15 is 42 MHz in frequency. A digital-to-analog (D/A) converter 32-1 converts a digital signal e from the comparator 31-5 of the feature quantity extracting circuit 31 to an analog signal $e_a$ varying between -1V and +1V.

A sinusoidal wave reference signal c of 28 MHz in frequency is constantly inputted to a frequency modulator 32-2. A spatial frequency of the output image corresponds to 400 lpi (lines/inch). The frequency modulator 32-2 shifts the frequency of the sinusoidal wave reference signal c of 28 MHz in the range of 14 MHz in accordance with a potential of the analog signal $e_a$, and outputs it as an frequency modulated signal r. Accordingly, as shown in FIG. 3(b), the frequency band of the frequency modulator 32-2 ranges from 14 to 42 MHz. The spatial frequency of the output image ranges from 200 lines to 600 lines.

Where the frequency band of the frequency modulator 32-2 ranges below 200 lines of the spatial frequency, interference of the image area, mesh points and folding distortion are caused. Where the frequency band of the frequency modulator 32-2 ranges above 600 lines of the spatial frequency, a possible sampling region is exceeded and harmonic folding distortion is caused.

To cope with this problem, a sampling spatial frequency N of the image signal, a center spatial frequency C of the frequency modulator 32-2, and a spatial frequency band width W of the frequency modulator 32-2 must be selected so as to satisfy the following expression.

$$N/3+W/2 \leq C \leq N-W/2$$

An automatic gain control (AGC) circuit 32-3 is used for keeping constant the amplitude of the output signal of the frequency modulator 32-2. In the instant embodiment, it is adjusted to be within -1V and +1V.

Figure 4:
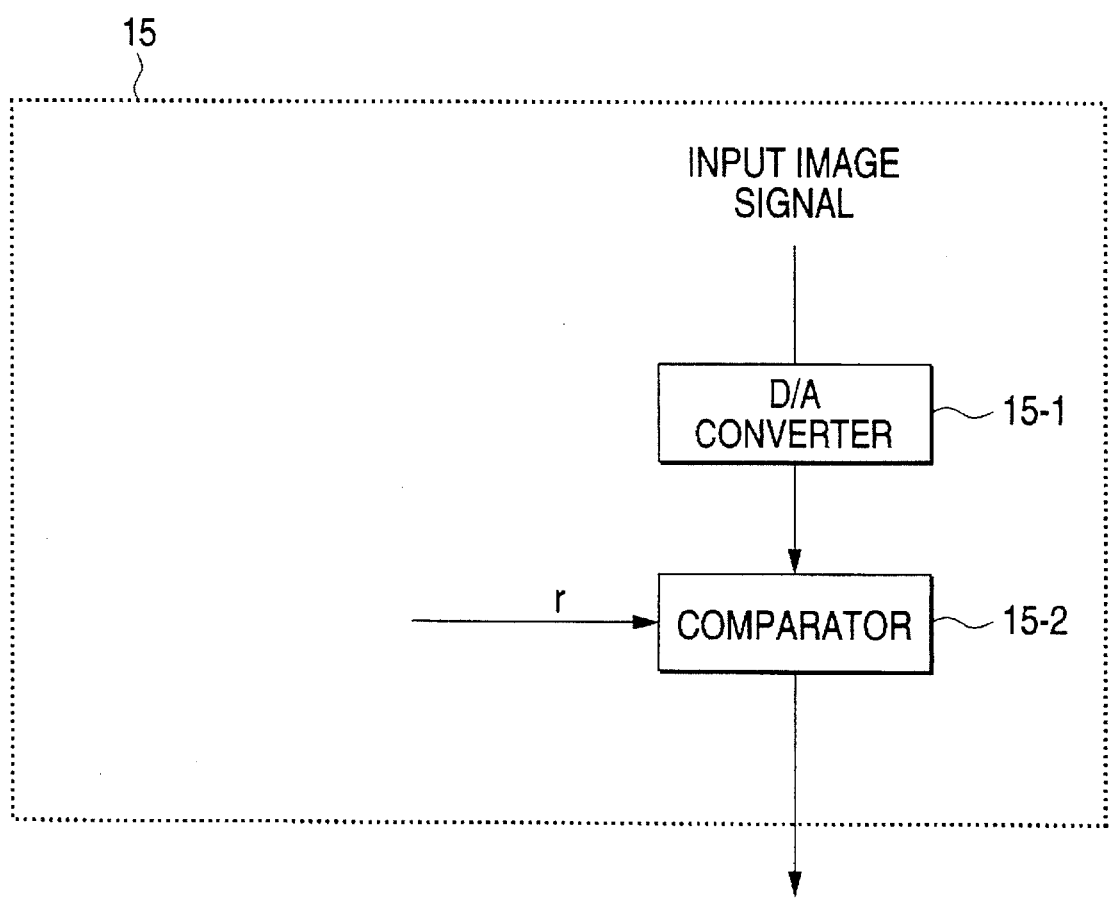
FIG. 4 is a block diagram showing a comparing circuit in the image processing apparatus of FIG. 1.

A block diagram of the comparing circuit 15 in the image processing apparatus of FIG. 1 is shown in FIG. 4. In the circuit, a digital-to-analog (D/A) converter 15-1 converts an input image signal into an analog signal varying between -1V to +1V. A comparator 15-2 compares the analog signal with an input signal r received from the frequency modulating circuit 32. In the embodiment, an image writing method by which print is made at the turn-on points of the laser beam is employed for the image output unit 16. Accordingly, the comparator 15-2 produces a laser-on signal only when the image signal is in excess of the input signal r from the frequency modulating circuit 32.

Figure 5:
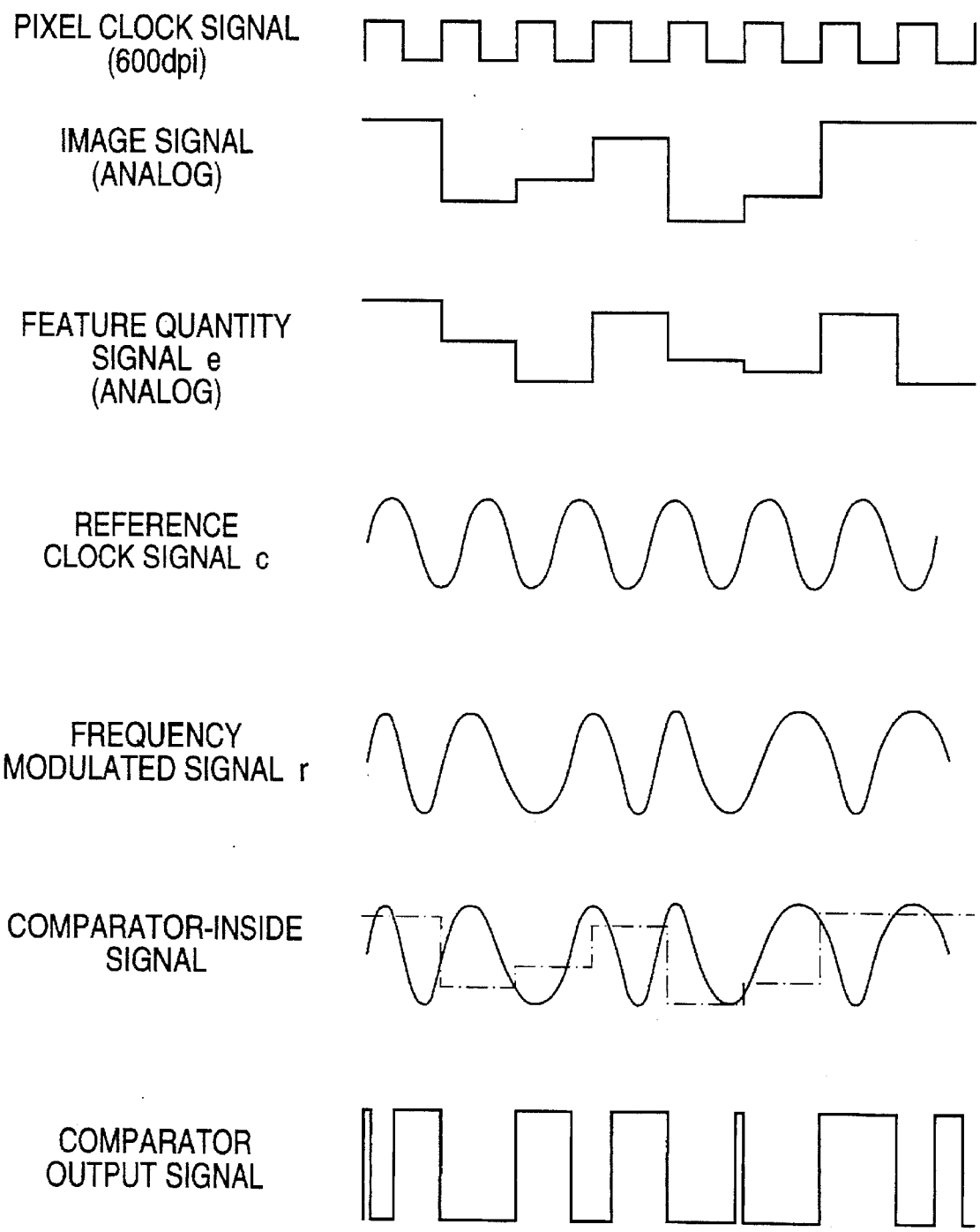
FIG. 5 is a diagram showing a set of waveforms of signals at key portions in the image processing apparatus of FIG. 1.

Waveforms of the pixel clock signal, the image signal, the feature quantity signal e, the reference clock signal c, the frequency modulated signal r, the comparator-inside signal, and the comparator output signal may typically be depicted as shown in FIG. 5. When an input contrast is low, the sinal of a low frequency is produced. When it is high, the signal of a high frequency is produced.

As seen from the foregoing description, a spatial frequency of mesh dots in the output Signal may continuously be varied in accordance with the quantity of shape feature of the input signal. In the case of an image having low input contrast, the tone performance of the image output unit is improved by the mesh dots of the low spatial frequency. In the case of an image having high input contrast, such as characters, an image having high sharpness and details is reproduced by the mesh dots of the high spatial frequency.

Accordingly, a laser beam for writing a latent electrostatic image on a photoreceptor may be pulse-width modulated. To form an image requiring high sharpness, such as character images, the pulse-width modulated laser beam of the decreased pulse width is outputted. To form an image requiring the tone reproduction, such as half-tone images, the laser beam of the increased pulse width is outputted. Thus, there is no need for the circuit for generating a plurality of reference frequencies, necessary for setting the pulse width, thus, simplifying the circuit construction.

What is claimed is:

1. An image processing method for use with an image forming apparatus having a photoreceptor scanned with a laser beam modulated by an image signal and a frequency modulating means for frequency modulating a reference signal, said method comprising the steps of:

comparing an input image signal with said reference signal which has been frequency modulated by said frequency modulating means in accordance with a shape feature of the input image signal, wherein a sampling spatial frequency N of the image signal, a center spatial frequency C of said frequency modulating means, and a spatial frequency band width W of said frequency modulating means are selected so as to satisfy the expression: N/3+W/2<C<N-W/2; and turning on and off the laser beam in accordance with a result of the comparison.

2. An image processing apparatus in which a photoreceptor is scanned with a laser beam modulated by an image signal, said apparatus comprising:

image input means for inputting an image signal to said image processing apparatus;

shape feature extracting means for extracting a shape feature of the image signal from said image input means;

frequency modulating means for frequency modulating a signal representative of the shape feature outputted from said shape feature extracting means to form a reference signal, wherein a sampling spatial frequency N of the image signal, a center spatial frequency C of said frequency modulating means, and a spatial frequency band width W of said frequency modulating means are selected so as to satisfy the expression: N/3+W/2<C<N-W/2; and comparing means for comparing the reference signal and the image signal to produce a signal for turning on and off the laser beam.

3. The image processing apparatus according to claim 2, wherein the reference signal is a sinusoidal wave signal.

4. The image processing apparatus according to claim 2, wherein the shape feature is a signal representative of the sharpness of the image signal.

* * * * *